US012610166B2

(12) United States Patent
Zheng

(10) Patent No.: US 12,610,166 B2
(45) Date of Patent: Apr. 21, 2026

(54) ELECTROACOUSTIC MODULE AND ELECTRONIC DEVICE

(71) Applicant: VIVO MOBILE COMMUNICATION CO., LTD., Guangdong (CN)

(72) Inventor: Ningjie Zheng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 201 days.

(21) Appl. No.: 18/665,699

(22) Filed: May 16, 2024

(65) Prior Publication Data

US 2024/0305918 A1 Sep. 12, 2024

Related U.S. Application Data

(63) Continuation of application No. PCT/CN2022/131091, filed on Nov. 10, 2022.

(30) Foreign Application Priority Data

Nov. 16, 2021 (CN) ......................... 202111369558.3

(51) Int. Cl.
*H04R 1/34* (2006.01)
*H04R 1/02* (2006.01)

(52) U.S. Cl.
CPC ............ *H04R 1/02* (2013.01); *H04R 2499/11* (2013.01)

(58) Field of Classification Search
CPC .......... H04R 1/323; H04R 1/34; H04R 1/345; H04R 1/347; H04R 1/403; H04R 2499/11
See application file for complete search history.

(56) References Cited

U.S. PATENT DOCUMENTS 7,711,131 B2 * 5/2010 Furuya .................. H04M 1/035 381/396
9,392,371 B2 * 7/2016 Nabata .................. H04R 17/00
(Continued)

FOREIGN PATENT DOCUMENTS

CN 110913048 A 3/2020
CN 110933211 A 3/2020
(Continued)

OTHER PUBLICATIONS

Extended European Search Report for Application No. 22894701.6, dated Jan. 31, 2025, 8 Pages.
(Continued)

*Primary Examiner* — Ryan Robinson
(74) *Attorney, Agent, or Firm* — BROOKS KUSHMAN P.C.

(57) ABSTRACT

An electroacoustic module includes an installation member, first and second sounding devices. The installation member includes first and second installation cavities, first and second sound outlets, and a sound guide channel. The first sounding device in the first installation cavity divides the first installation cavity into a first front cavity connected to the first sound outlet and a first rear cavity. The second sounding device in the second installation cavity divides the second installation cavity into a second front cavity connected to the second sound outlet and a second rear cavity which is a closed cavity and which is connected to the first rear cavity through the sound guide channel. A phase of a first sound wave emitted by the first sounding device through the first sound outlet is different from a phase of a second sound wave emitted by the first sounding device through the second sound outlet.

17 Claims, 6 Drawing Sheets

(56) References Cited

U.S. PATENT DOCUMENTS

| | | | | |
|---|---|---|---|---|
| 10,609,465 | B1 * | 3/2020 | Wakeland | H04R 1/028 |
| 2021/0044688 | A1 * | 2/2021 | Rusconi Clerici Beltrami | H04R 17/00 |
| 2023/0254395 | A1 | 8/2023 | Chen et al. | |
| 2024/0205594 | A1 * | 6/2024 | Li | H04R 1/403 |

FOREIGN PATENT DOCUMENTS

| | | | | | |
|---|---|---|---|---|---|
| CN | 110944079 | A | | 3/2020 | |
| CN | 111225086 | A | * | 6/2020 | H04M 1/026 |
| CN | 111464680 | A | | 7/2020 | |
| CN | 112261202 | A | | 1/2021 | |
| CN | 114125115 | A | | 3/2022 | |
| WO | WO-2021170220 | A1 | * | 9/2021 | H04R 1/323 |

OTHER PUBLICATIONS

International Search Report and Written Opinion for Application No. PCT /CN2022/131091, dated Feb. 10, 2023, 16 Pages.

* cited by examiner

ELECTROACOUSTIC MODULE AND ELECTRONIC DEVICE

CROSS-REFERENCE TO RELATED APPLICATIONS

This application is a continuation of International Application No. PCT/CN2022/131091 filed on Nov. 10, 2022, which claims priority to Chinese Patent Application No. 202111369558.3, filed on Nov. 16, 2021, which are incorporated herein by reference in their entireties.

TECHNICAL FIELD

This application pertains to the field of communication device technologies, and specifically relates to an electroacoustic module and an electronic device.

BACKGROUND

With the advancement of technologies and the improvement of user requirements, in a process of using an electronic device, a user usually needs to turn up volume in order to have a clear call in a noisy environment. In this case, due to an inevitable gap between the user's ear and the electronic device, sound leaks out through the gap to the surrounding environment, allowing nearby people to hear the content of the user's call. Correspondingly, to avoid privacy leakage, the user usually has to turn down the volume, which makes it difficult for the user to have a clear call. This causes a problem that call security and call clarity during a call cannot be achieved at the same time for a current electronic device.

SUMMARY

According to a first aspect, an embodiment of this application discloses an electroacoustic module, including an installation member, a first sounding device, and a second sounding device. The installation member is provided with a first installation cavity, a second installation cavity, a first sound outlet, a second sound outlet, and a sound guide channel. The first sounding device is installed in the first installation cavity, and the first sounding device divides the first installation cavity into a first front cavity and a first rear cavity. The second sounding device is installed in the second installation cavity, and the second sounding device divides the second installation cavity into a second front cavity and a second rear cavity. The first front cavity is connected to the first sound outlet, and the first rear cavity is connected to the second front cavity through the sound guide channel. The second front cavity is connected to the second sound outlet, and the second rear cavity is a closed cavity. A phase of a first sound wave emitted by the first sounding device through the first sound outlet is different from a phase of a second sound wave emitted by the first sounding device through the second sound outlet.

According to a second aspect, an embodiment of this application discloses an electronic device, including a housing and the foregoing electroacoustic module. The housing is provided with an accommodating cavity, a third sound outlet, and a fourth sound outlet, the third sound outlet is provided on a first side of the accommodating cavity, the fourth sound outlet is provided on a second side of the accommodating cavity, the installation member is installed in the accommodating cavity, the first front cavity is connected to the third sound outlet through the first sound outlet, and the second front cavity is connected to the fourth sound outlet through the second sound outlet.

BRIEF DESCRIPTION OF DRAWINGS

Accompanying drawings described herein are used to provide a further understanding of this application and constitute a part of this application. Illustrative embodiments of this application and descriptions thereof are intended to explain this application, and do not constitute an improper limitation on this application. In the accompanying drawings.

REFERENCE NUMERALS

Figure 1:
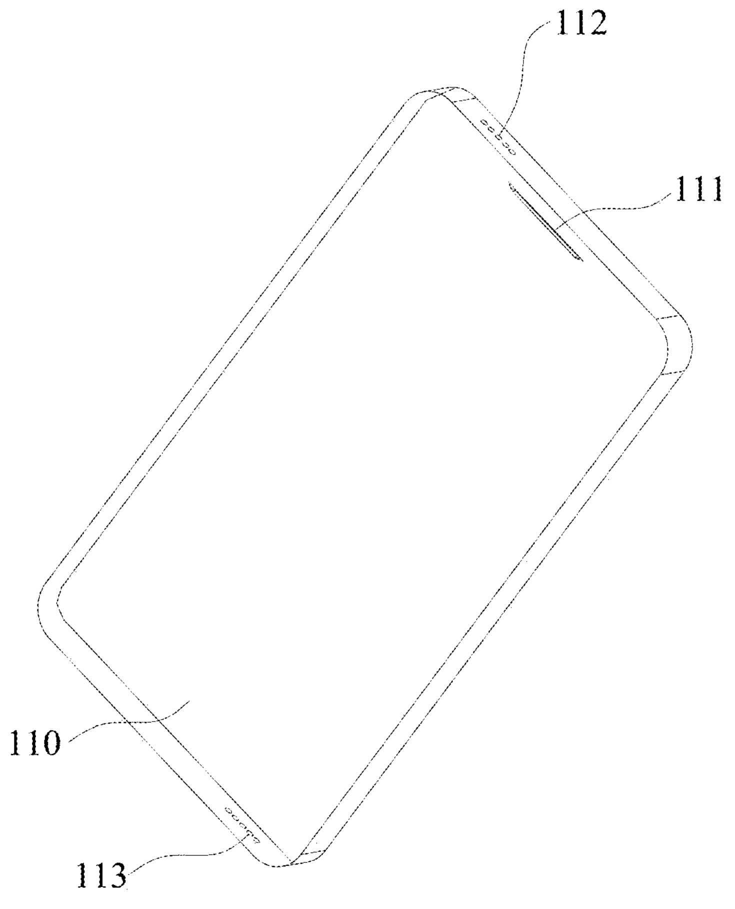
FIG. 1 is a schematic diagram of a structure of a housing of an electronic device according to an embodiment of this application.

110: housing; 111: third sound outlet; 112: fourth sound outlet; 113: fifth sound outlet; 120: installation member; 121: first front cavity; 122: first rear cavity; 123: second front cavity; 124: second rear cavity; 125: first sound outlet; 126: second sound outlet; 127: sound guide channel; 120*a*: installation base; 120*b*: enclosing portion; 120*c*: cover plate; 130: dustproof net; 140: display; 150: rear housing;

310: first sounding device; 320: second sounding device.

DETAILED DESCRIPTION

The following clearly and completely describes technical solutions in embodiments of this application with reference to accompanying drawings in embodiments of this application. Apparently, the described embodiments are some but not all of embodiments of this application. All other embodiments obtained by a person of ordinary skill in the art based on embodiments of this application without creative efforts shall fall within the protection scope of this application.

The terms "first", "second", and the like in this specification and claims of this application are used to distinguish between similar objects instead of describing a specific order or sequence. It should be understood that terms used in such a way are interchangeable in proper circumstances, so that embodiments of this application can be implemented in an order other than the order illustrated or described herein. Objects classified by "first", "second", and the like are usually of a same type, and a quantity of objects is not limited. For example, there may be one or more first objects. In addition, in this specification and the claims, "and/or" indicates at least one of connected objects, and a character "/" generally indicates an "or" relationship between associated objects.

With reference to the accompanying drawings, the following describes in detail an electroacoustic module and an electronic device provided in embodiments of this application by using specific embodiments and application scenarios.

As shown in FIG. 1 to FIG. 9, embodiments of this application disclose an electroacoustic module and an electronic device. The electroacoustic module includes an installation member 120, a first sounding device 310, and a second sounding device 320.

The installation member 120 is provided with a first installation cavity, a second installation cavity, a first sound outlet 125, a second sound outlet 126, and a sound guide channel 127. Specifically, at least one of the first installation cavity, the second installation cavity, the first sound outlet 125, the second sound outlet 126, and the sound guide channel 127 may be formed together as the installation member 120 is molded, or may be formed in a manner such as drilling after the installation member 120 is molded. Parameters such as specific shapes and sizes of the first installation cavity, the second installation cavity, the first sound outlet 125, the second sound outlet 126, and the sound guide channel 127 may be determined based on parameters such as actual sizes of the first sounding device 310 and the second sounding device 320. This is not limited herein.

Figure 2:
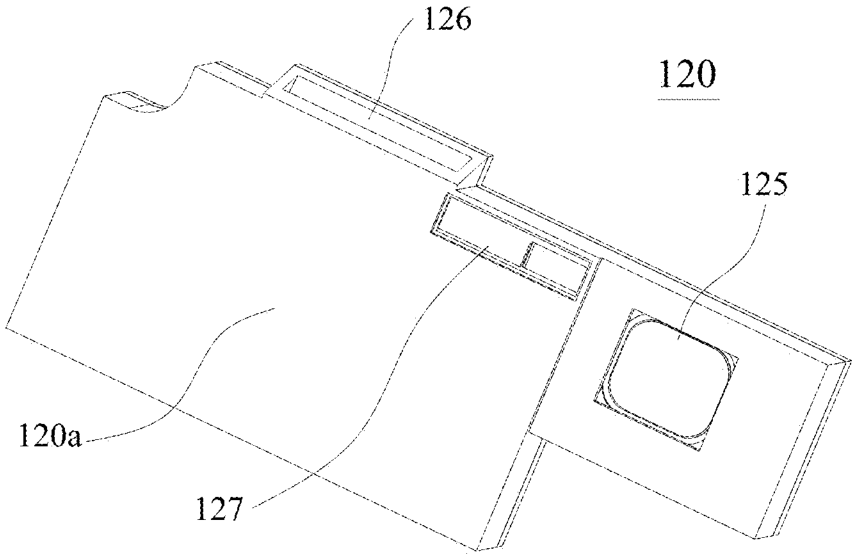
FIG. 2 is a schematic diagram of a structure of an installation member of an electroacoustic module according to an embodiment of this application.
Figure 3:
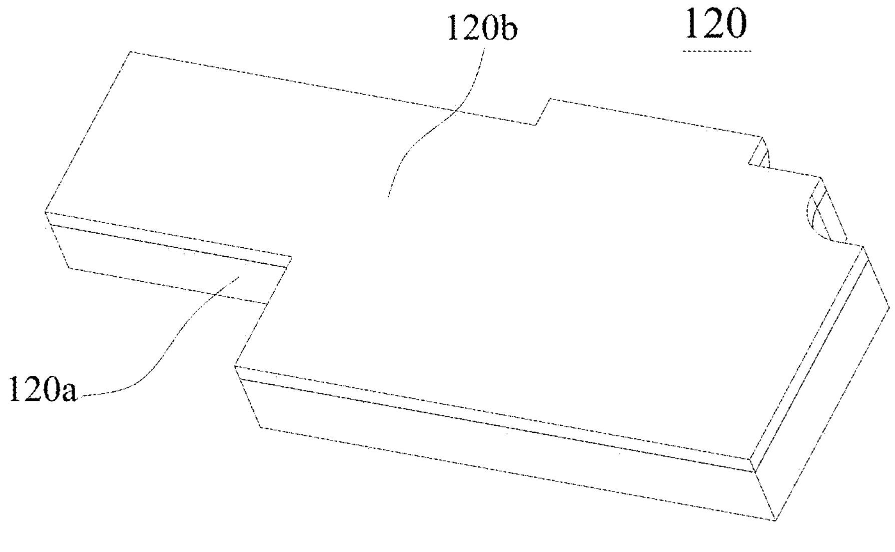
FIG. 3 is a schematic diagram of a structure in another direction of an installation member of an electroacoustic module according to an embodiment of this application.

In a process of providing the first installation cavity, the second installation cavity, the first sound outlet 125, the second sound outlet 126, and the sound guide channel 127, as shown in FIG. 2, the first sound outlet 125 is provided on a first side of the installation member 120. In a case that the electroacoustic module is used in an electronic device, the first side of the installation member 120 may be directed to a display side of the electronic device, where the display side of the electronic device is a side on which a display 140 of the electronic device is located. In this case, when a user uses the electronic device including the electroacoustic module to hear voice information, the display side of the electronic device is directed to an ear of the user, and the first sound outlet 125 is aligned with the ear of the user, to ensure, to a greatest extent, that sound signals generated by the electroacoustic module can travel to the ear of the user through the first sound outlet 125. Specifically, the second sound outlet 126 may be provided on the first side of the installation member 120. Certainly, the second sound outlet 126 may alternatively be provided on another side of the installation member 120. This is not limited herein. Parameters such as areas of the second sound outlet 126 and the first sound outlet 125 may be determined based on corresponding sizes of the first sounding device 310 and the second sounding device 320.

In addition, the first sounding device 310 is installed in the first installation cavity, and the first sounding device 310 divides the first installation cavity into a first front cavity 121 and a first rear cavity 122. The second sounding device 320 is installed in the second installation cavity, and divides the second installation cavity into a second front cavity 123 and a second rear cavity 124. As described above, sizes and shapes of the first installation cavity and the second installation cavity may be determined based on specific structures of the first sounding device 310 and the second sounding device 320, to ensure that the first sounding device 310 has a capability of isolating the first front cavity 121 from the first rear cavity 122, and the second sounding device 320 has a capability of isolating the second front cavity 123 from the second rear cavity 124. Sound waves emitted by the first sounding device 310 can travel to the first front cavity 121 and the first rear cavity 122 separately. Correspondingly, sound waves emitted by the second sounding device 320 can travel to the second front cavity 123 and the second rear cavity 124 separately. Making the second rear cavity 124 a closed cavity can basically prevent the sound waves emitted by the second sounding device 320 from traveling out of the electroacoustic module through the second rear cavity 124.

Figure 6:
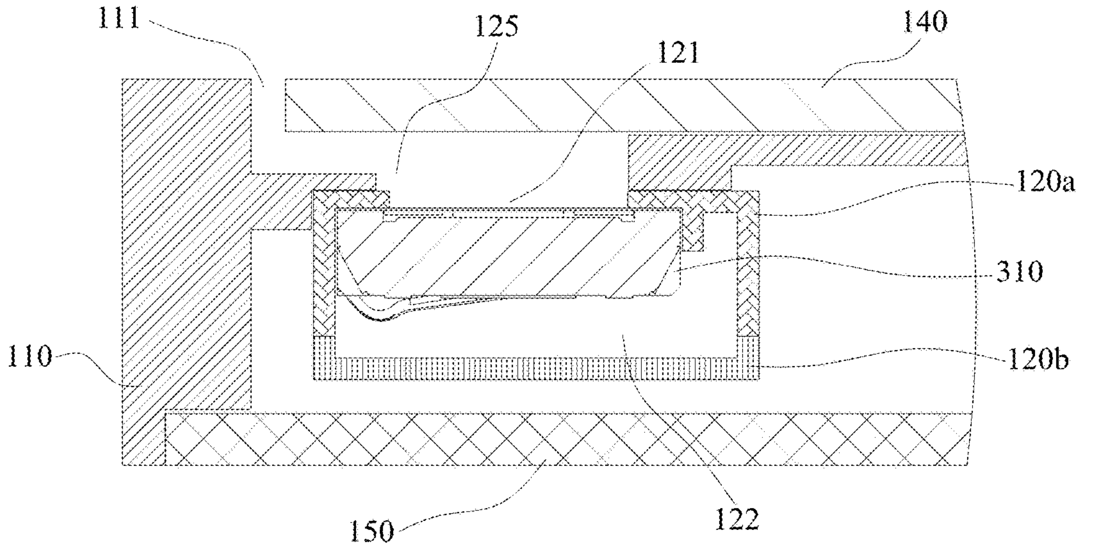
FIG. 6 is a schematic cross-sectional view of a partial structure of an electroacoustic module including a first sounding device according to an embodiment of this application.
Figure 7:
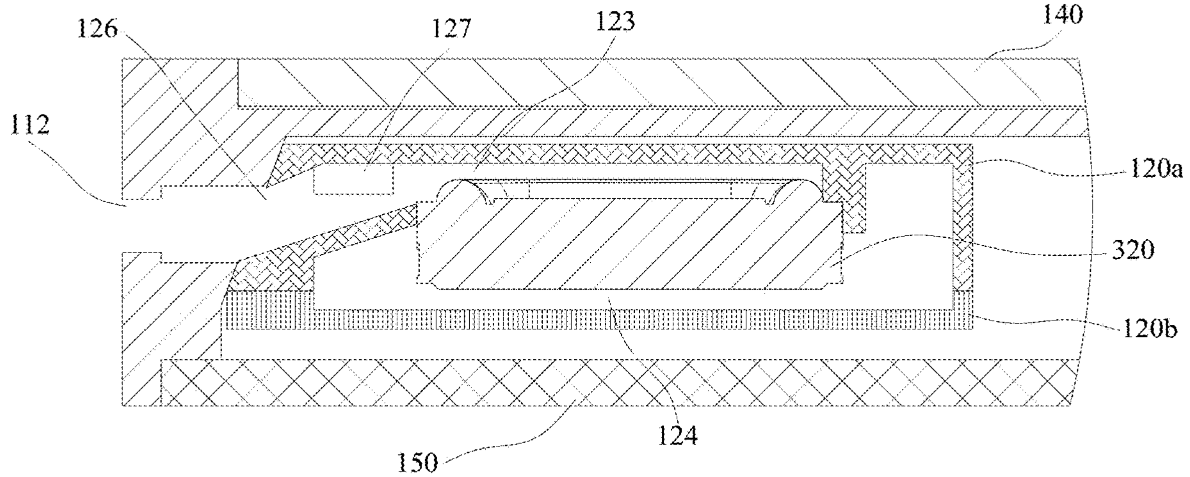
FIG. 7 is a schematic cross-sectional view of a partial structure of an electroacoustic module including a second sounding device according to an embodiment of this application.
Figure 8:
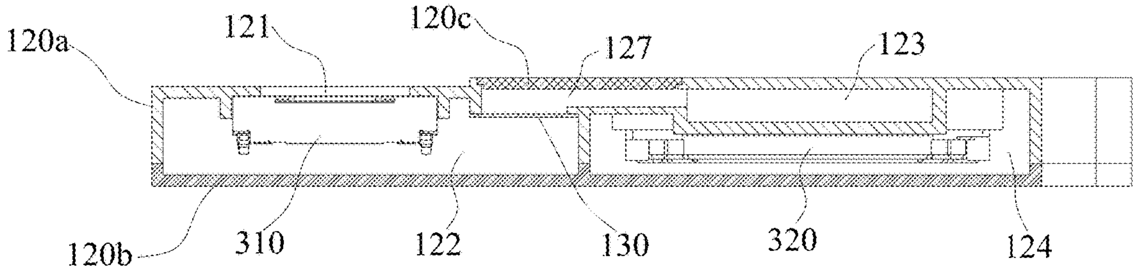
FIG. 8 is a schematic cross-sectional view of a partial structure of an electroacoustic module including a sound guide channel according to an embodiment of this application.

In addition, as shown in FIG. 6 to FIG. 8, the first front cavity 121 is connected to the first sound outlet 125, the first rear cavity 122 is connected to the second front cavity 123 through the sound guide channel 127, and the second front cavity 123 is connected to the second sound outlet 126. In a case that the first sounding device 310 operates, the sound wave in the first front cavity 121 can travel out through the first sound outlet 125 to the ear of the user, and the sound wave in the first rear cavity 122 can travel to the second front cavity 123 and then travel out through the second sound outlet 126. Correspondingly, the sound wave that travels out through the second sound outlet 126 can travel out of the electroacoustic module. A phase of a second sound wave emitted by the first sounding device 310 through the second sound outlet 126 is different from a phase of a first sound wave emitted by the first sounding device 310 through the first sound outlet 125, so that the first sound wave and the second sound wave with different phases produce a cancellation effect when meeting each other, to increase attenuation efficiency and attenuation degrees of the sound waves in a process of traveling out of the electroacoustic module, and avoid sound leakage during a call.

Embodiments of this application provide an electroacoustic module and an electronic device. The electroacoustic module includes an installation member 120, a first sounding device 310, and a second sounding device 320. The first sounding device 310 is installed in a first installation cavity of the installation member 120, and divides the first installation cavity into a first front cavity 121 and a first rear cavity 122. The second sounding device is installed in a second installation cavity of the installation member 120, and divides the second installation cavity into a second front cavity 123 and a second rear cavity 124. The first front cavity 121 is connected to a first sound outlet 125 of the installation member 120, the first rear cavity 122 is connected to the second front cavity 123 through a sound guide channel 127, and the second front cavity 123 is connected to a second sound outlet 126, so that a first sound wave emitted by the first sounding device 310 can travel out from the first front cavity 121 through the first sound outlet 125, and a second sound wave emitted by the first sounding device 310 can travel out from the first rear cavity 122 through the sound guide channel 127, the second front cavity 123, and the second sound outlet 126.

When an electronic device including the foregoing electroacoustic module is in a state of a handheld call or voice information hearing, both the first sound wave and the second sound wave that travel out through the first sound outlet 125 and the second sound outlet 126 respectively can propagate sound signals out of the electronic device. In addition, different phases of the first sound wave and the second sound wave that are emitted by the first sounding device 310 through the first sound outlet 125 and the second sound outlet 126 respectively ensure that the first sound wave and the second sound wave can produce a mutual cancellation effect when meeting each other around the electronic device. Therefore, in a case that volume of the first sounding device 310 is relatively high, it is ensured that a user can have a clear call or hear a voice clearly, and voice information from the electronic device can be basically prevented from being heard by nearby people, so that privacy of the user is protected and the electronic device has a capability of achieving security and call clarity at the same time.

Figure 9:
FIG. 9 is a simulation comparison diagram of sound leakage situations of a first sounding device before and after improvement of an electroacoustic module.

In a specific simulation detection process, as shown in FIG. 9, it can be verified from a simulation result that, in a case that the foregoing technical solution is used, the first sound wave and the second sound wave that are emitted by the first sounding device 310 travel out through the first sound outlet 125 and the second sound outlet 126 respectively, so that volume of leaked sound can be reduced by 5 to 20 dB on a frequency band of 200 Hz to 3000 Hz.

In addition, in the electroacoustic module provided in the foregoing embodiment, the first sounding device 310 may be specifically a telephone receiver, and the second sounding device 320 may be specifically a speaker. In a process in which the user uses the electronic device including the foregoing electroacoustic module, the telephone receiver can provide a function such as calling or voice information hearing for the user. When the user wants to watch a video or listen to music or the like, the speaker can be used for sound playing, and sound emitted by the second sounding device 320 travels out from the second front cavity 123 through the second sound outlet 126. Because the second rear cavity 124 is a closed cavity, the sound emitted by the second sounding device 320 travels out only through the second sound outlet 126, and the first rear cavity 122 and the second rear cavity 124 do not affect a sound-emitting effect of the second sounding device 320, so that audiovisual experience of the user is improved.

More intuitively, both the first sounding device 310 and the second sounding device 320 are basic configured components in the electronic device. In embodiments of this application, existing components of the electroacoustic module of the electronic device are used for improvement of the installation member 120 of the electroacoustic module, so that an objective of solving sound leakage for the electronic device during a call is achieved in a case that additional components are basically not needed. Improvement costs are relatively low, and an improvement effect is relatively good.

Further, parameters such as positions of the first sound outlet 125 and the second sound outlet 126 may be set, so that when the first sound wave that travels out through the first sound outlet 125 and the second sound wave that travels out through the second sound outlet 126 meet each other around the electroacoustic module, the phase of the first sound wave is opposite to the phase of the second sound wave, to enhance the cancellation effect of the first sound wave and the second sound wave. Therefore, when the first sound outlet 125 of the electroacoustic module is used for voice information propagation, the electroacoustic module basically does not leak sound around, which maximally avoids user privacy leakage.

Optionally, the first sound outlet 125 is a cavity opening of the first installation cavity, and the first sound outlet 125 is a demolding opening of the first installation cavity. Correspondingly, the second sound outlet 126 is a cavity opening of the second installation cavity, and the second sound outlet 126 is a demolding opening of the second installation cavity. In a case that the foregoing technical solution is used, the first installation cavity, the second installation cavity, the first sound outlet 125, and the second sound outlet 126 may be integrally formed with the installation member 120 in a multi-cavity injection molding manner. This can improve efficiency in processing the installation member 120, to improve efficiency in producing the entire electroacoustic module, and can further improve processing precision of the first installation cavity and the second installation cavity, to ensure relatively good improvement in sound leakage problems of different batches of electroacoustic modules. In addition, in the foregoing technical solution, the sound guide channel 127 may be formed in a manner such as drilling after processing of the installation member 120 is completed, so that the first rear cavity 122 can be connected to the second front cavity 123 through the sound guide channel 127.

In the foregoing technical solution, after the installation member 120 is molded, the first sounding device 310 may be installed in the first installation cavity through the first sound outlet 125, and the second sounding device 320 may be installed in the second installation cavity through the second sound outlet 126. In addition, components such as a sealing gasket may be used, to ensure that the first sounding device 310 can divide the first installation cavity into the first front cavity 121 and the first rear cavity 122, and the first sounding device 310 may be fastened to a middle part of the first installation cavity in a manner such as bonding or snap-fitting. Correspondingly, the second sounding device 320 may be installed in the second installation cavity in a fastening manner such as bonding, supplemented with a sealing gasket for sealing, so that the second sounding device divides the second installation cavity into the second front cavity 123 and the second rear cavity 124.

In another embodiment of this application, along an axial direction of the first sound outlet 125, as shown in FIG. 6, the first sounding device 310 is attached to an inner wall, close to the first sound outlet 125, of the first installation cavity. In this case, the first sound wave emitted by the first sounding device 310 can travel out of the installation member 120 through the first front cavity 121 and the first sound outlet 125 directly, and travel out of the electroacoustic module through the first sound outlet 125, to minimize a length of a traveling path of the first sound wave emitted by the first sounding device 310 through the first sound outlet 125, and increase an effective traveling degree of the first sound wave. In addition, in a case that the foregoing technical solution is used, as shown in FIG. 6, because the first front cavity 121 is enclosed by a cavity wall of the first installation cavity of the installation member 120, and the entire first front cavity 121 faces the first sounding device 310, the first sound wave basically does not reflect in the first front cavity 121. This can further increase effectiveness of the first sound wave emitted by the first sounding device 310, and further improve call experience of the user.

Figure 4:
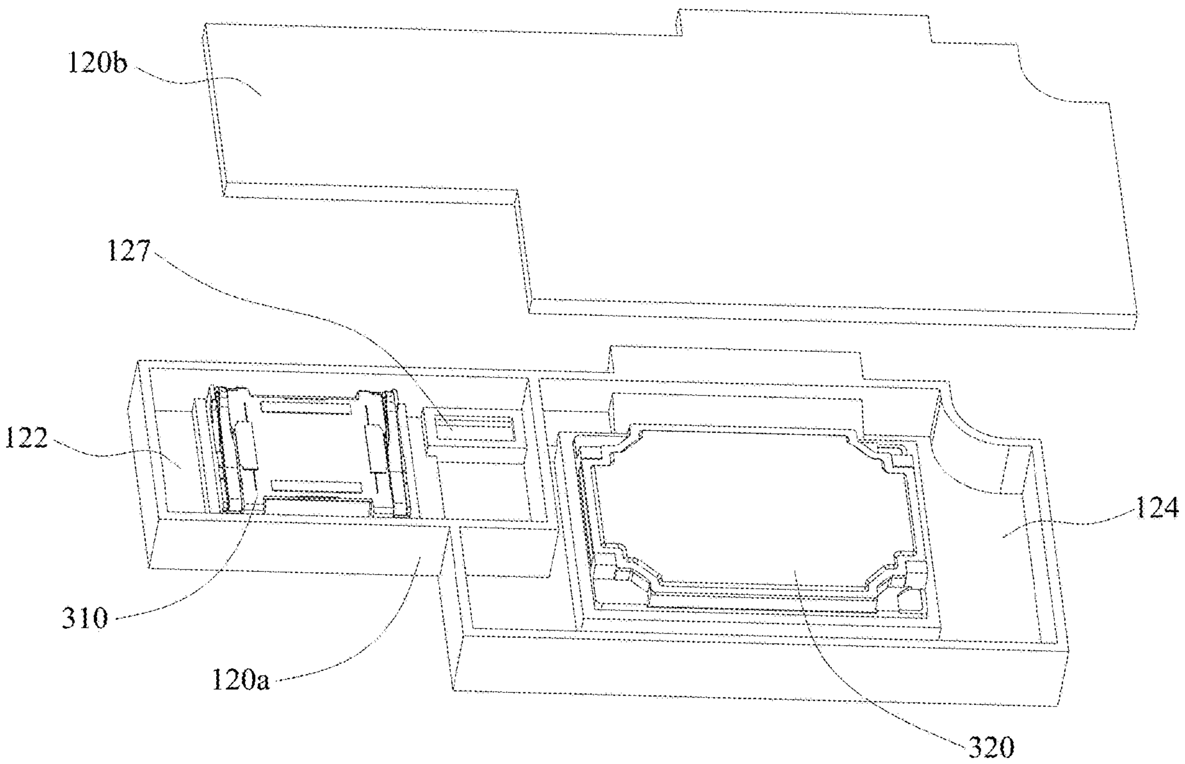
FIG. 4 is a schematic diagram of assembly of a first sounding device, a second sounding device, and an installation member of an electroacoustic module according to an embodiment of this application.
Figure 5:
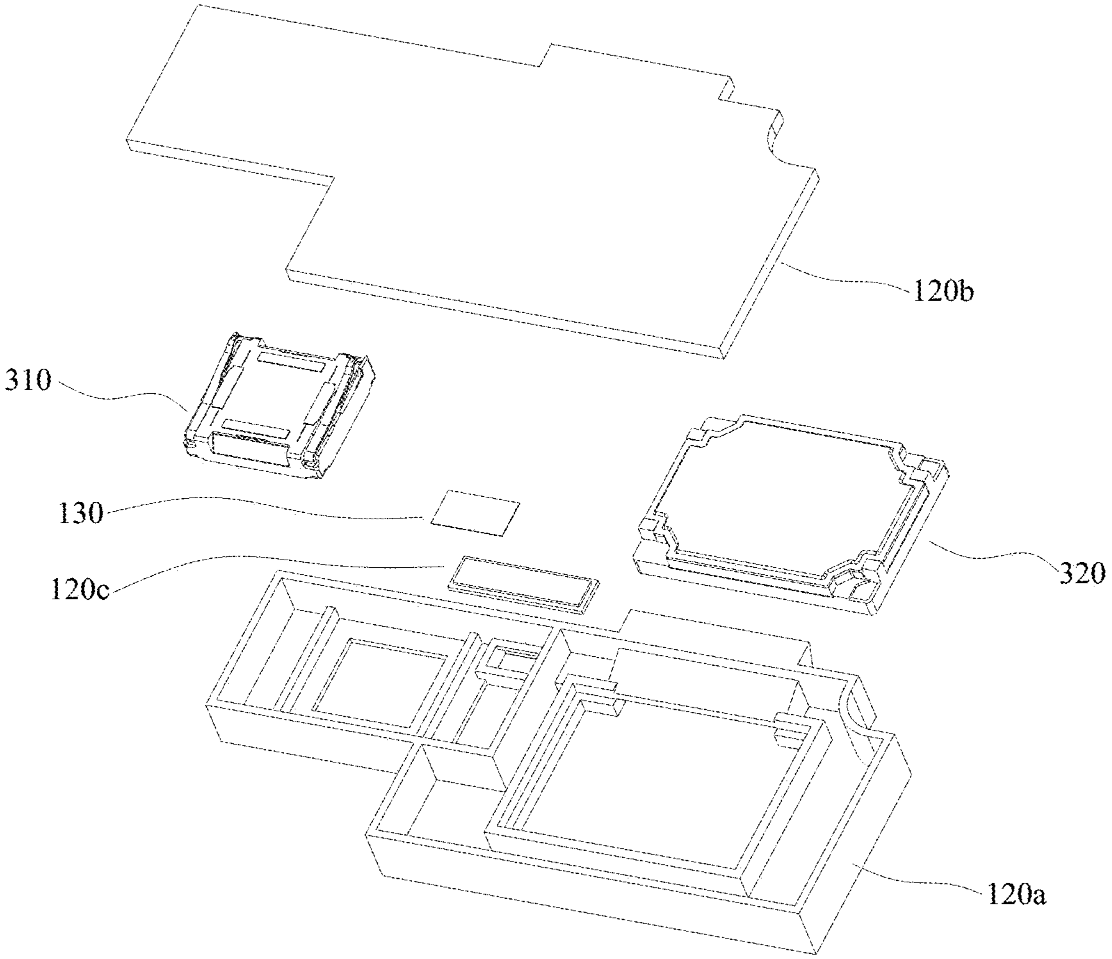
FIG. 5 is a schematic exploded view of a structure shown in FIG. 4.

To reduce difficulty in forming the first installation cavity, the second installation cavity, the first sound outlet 125, and the second sound outlet 126, as shown in FIG. 4 to FIG. 6, the installation member 120 may include an installation base 120*a* and an enclosing portion 120*b*. The installation base 120*a* is provided with the first sound outlet 125 and the second sound outlet 126, and the installation base 120*a* and the enclosing portion 120*b* enclose the first installation cavity and the second installation cavity. In a process of using the foregoing technical solution, the installation base 120*a* may be integrally formed in a manner such as multi-cavity injection molding. In the axial direction of the first sound outlet 125, it is ensured that a projection of the first sound outlet 125 is located within a projection of the first installation cavity, and an edge of the projection of the first installation cavity is located outside the projection of the first sound outlet 125, so that a structure configured to limit a position of the first sounding device 310 is formed on the inner wall, close to the first sound outlet 125, of the first installation cavity. There is a similar arrangement for the second installation cavity and the second sound outlet 126, to ensure that a structure configured to limit a position of the second sounding device 320 is formed on an inner wall, close to the second sound outlet 126, of the second installation cavity.

Correspondingly, the enclosing portion 120*b* may be specifically a plate-shaped structure, the first installation cavity and the second installation cavity are arranged along a direction perpendicular to an axial direction of the enclosing portion 120*b*, and the enclosing portion 120*b* is perpendicular to the axial direction of the first sound outlet 125, to ensure that the installation base 120*a* can be formed in the foregoing multi-cavity injection molding manner. There are at least two molds used for molding, one may be taken out along the axial direction of the first sound outlet 125 toward a side on which the enclosing portion 120*b* is located, and the other may be taken out along an axial direction of the second sound outlet 126 toward a side that is away from the second installation cavity.

More specifically, a size and a shape of the first sound outlet 125 may be the same as a size and a shape of a sound-emitting region of the first sounding device 310. Then, the sound-emitting region of the first sounding device 310 is provided to correspond to the first sound outlet 125, to ensure relatively high sound-emitting effectiveness of the first sounding device 310.

In the electroacoustic module provided in the foregoing embodiment, the sound guide channel 127 may be provided on a same side of the first installation cavity and the second installation cavity. In another embodiment of this application, as shown in FIG. 8, the sound guide channel 127 is located between the first installation cavity and the second installation cavity along an arrangement direction of the first installation cavity and the second installation cavity. This can basically minimize a length of the sound guide channel 127, and reduce loss of the second sound wave. In addition, in a case that the foregoing technical solution is used, a quantity of times for bending the sound guide channel 127 can be minimized, loss of the sound wave and phase control difficulty are reduced, and a degree of improvement in sound leakage of the electroacoustic module is increased.

The sound guide channel 127 is provided with a first communication hole and a second communication hole, the first communication hole is connected to the first rear cavity 122, and the second communication hole is connected to the second front cavity 123. Optionally, an axial direction of the first communication hole is parallel to an axial direction of the second communication hole, and both the axial direction of the first communication hole and the axial direction of the second communication hole are parallel to an arrangement direction of the first rear cavity and the second front cavity. In this case, the sound guide channel 127 is a linear structure.

In another embodiment of this application, as shown in FIG. 2 and FIG. 8, the first sound outlet 125 is provided on a first side of the installation member 120, the second sound outlet 126 is provided on a second side of the installation member 120, and the first side and the second side are two adjacent sides of the installation member 120. In this embodiment, effectiveness of the second sound wave is relatively high, and loss of the second sound wave can be reduced. In addition, in a user call mode, relative interference between the first sound wave and the second sound wave can be avoided, ensuring a relatively high sound-receiving effect for an ear of the user.

Based on the foregoing embodiment, optionally, the axial direction of the first communication hole is parallel to the axial direction of the first sound outlet 125, and both the axial direction of the first sound outlet 125 and the axial direction of the second sound outlet 126 are perpendicular to the axial direction of the second communication hole. In this embodiment, when the first rear cavity 122 is connected to the second front cavity 123, a bend is provided for the sound guide channel 127, so that in the axial direction of the first sound outlet 125, a size of the entire installation member 120 is relatively small. In addition, the first communication hole is perpendicular to the second communication hole, to improve structure strength of a position at which the sound guide channel 127 of the installation member 120 is located, and improve structure stability of the installation member 120.

In the electroacoustic module disclosed in embodiments of this application, the sound guide channel 127 may be formed in a manner such as drilling after the installation member 120 is formed. In another embodiment of this application, optionally, as shown in FIG. 5 and FIG. 8, the installation member 120 includes an installation base 120*a* and a cover plate 120*c* that are disposed separately, and the installation base 120*a* and the cover plate 120*c* are connected in a sealed manner and enclose the sound guide channel 127. In this case, a concave part of the sound guide channel 127 may be formed with the installation base 120*a* in an integrated injection molding manner. This can reduce difficulty in processing the sound guide channel 127, ensure corresponding consistency of structures and sizes of sound guide channels 127 on different installation members 120, and ensure that sound guide effects of the sound guide channels 127 are basically the same. As described above, the installation base 120*a* may be further provided with the first sound outlet 125 and the second sound outlet 126. Based on the foregoing embodiment, the installation member 120 may include the installation base 120*a*, the cover plate 120*c*, and the foregoing enclosing portion 120*b*, and the enclosing portion 120*b* and the cover plate 120*c* are respectively connected to two opposite sides of the installation base 120*a* in a sealed manner.

Optionally, as shown in FIG. 8, the electroacoustic module provided in embodiments of this application may further include a dustproof net 130, and the dustproof net 130 is disposed at the first communication hole. In a case that this technical solution is used, in a process in which the second sound wave travels from the first rear cavity 122 through the sound guide channel 127 to the second front cavity 123, the dustproof net 130 can prevent dust or impurities in the first rear cavity 122 from entering the sound guide channel 127, so as to prevent the dust or impurities from adversely affecting a sound guide effect of the sound guide channel 127 and from blocking the sound guide channel 127. Specifically, the dustproof net 130 may be made of a metal material such as stainless steel, to improve structure strength and a service life of the dustproof net 130, and the dustproof net 130 may be fastened to the first communication hole through bonding.

Based on the electroacoustic module disclosed in any one of the foregoing embodiments, an embodiment of this application further provides an electronic device, and the electronic device includes a housing and the foregoing electroacoustic module. The housing is provided with an accommodating cavity, a third sound outlet 111, and a fourth sound outlet 112, the third sound outlet 111 is provided on a first side of the accommodating cavity, the fourth sound outlet 112 is provided on a second side of the accommodating cavity, and the first side and the second side are two adjacent sides of the accommodating cavity. The installation member 120 is installed in the accommodating cavity. The first front cavity 121 can be connected to the third sound outlet 111 through the first sound outlet 125, and the second front cavity 123 can be connected to the fourth sound outlet 112 through the second sound outlet 126, so that the first sound wave can travel out through the third sound outlet 111, and the second sound wave can travel out through the fourth sound outlet 112. Optionally, the electronic device may be further provided with a fifth sound outlet 113, and a sounding device such as a speaker may be disposed to correspond to the fifth sound outlet 113. The fifth sound outlet 113 and the fourth sound outlet 112 are respectively provided at two opposite ends of the housing 110, so that the electronic device has a capability of producing a stereo sound effect.

Further, the electronic device may further include components such as a display 140 and a rear housing 150. Generally, the housing 110 may be a cubic structure, the display 140 is installed on the housing 110, a side on which the display 140 is located is a display side of the electronic device, the display 140 may display content required to be displayed by the electronic device, the rear housing 150 is disposed on a side, away from the display 140, of the housing 110, and the side on which the rear housing 150 is located is a back side of the electronic device.

Based on this, the entire third sound outlet 111 may be located on the housing 110 or on the display 140, or the third sound outlet 111 may be provided between the housing 110 and the display 140, that is, the housing 110 and the display 140 enclose the third sound outlet 111. The fourth sound outlet 112 is provided on a side, adjacent to the display side, of the housing 110, that is, the fourth sound outlet 112 is provided on a side adjacent to the third sound outlet 111. As described above, the entire housing 110 is a cubic structure. In an example in which the display side is a front side of the electronic device, a side away from the display side, that is, the side on which the rear housing 150 is located, is a back side of the electronic device, an arc-shaped side located between the front side and the back side is a side adjacent to the display side, and the fourth sound outlet 112 is provided on the arc-shaped side of the housing 110. In this case, because the third sound outlet 111 is provided on the display side of the housing 110, and the fourth sound outlet 112 is provided on the side, adjacent to the display side, of the housing 110, both the third sound outlet 111 and the fourth sound outlet 112 have capabilities of diffusing sound waves around the electronic device, ensuring that the first sound wave and the second sound wave have conditions to meet and cancel each other out.

To maximize a display area of the electronic device, optionally, the third sound outlet 111 is located at an edge, close to a first end of the housing 110, of the display side, that is, the third sound outlet 111 is located at the edge of the display side. This can minimize impact of the third sound outlet 111 on the display area of the electronic device. For example, the third sound outlet 111 may be provided at an edge position, close to a top part, of the display side of the housing 110. The top part is an uppermost end of the housing 110 of the electronic device when the electronic device is in a state of a handheld call.

Based on the foregoing case, the fourth sound outlet 112 is provided on an end surface of the first end of the electronic device. In this case, traveling ranges of a majority of sound waves that leak out from the third sound outlet 111 are space on a side, away from the electronic device, of the first end. Based on this, the fourth sound outlet 112 is provided on the end surface of the first end, so that the fourth sound outlet 112 faces a main sound leakage region of the third sound outlet 111, to ensure, to a greatest extent, that the second sound wave and the leaked first sound wave are superposed and cancel each other out, thereby improving a sound leakage situation of the electronic device.

Optionally, as shown in FIG. 6, along an axial direction of the third sound outlet 111, a projection of the third sound outlet 111 is located outside a projection of the first sound outlet 125. In this case, dust or impurities outside the electronic device can be maximally prevented from entering the first sound outlet 125 through the third sound outlet 111 and from adversely affecting a sound-emitting effect of the first sounding device 310. Further, the third sound outlet 111 may be provided with a dustproof net, and the dustproof net can isolate dust or impurities, to prevent the impurities from entering the electronic device through the third sound outlet 111.

It should be noted that, in this specification, the term “include”, “comprise”, or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element defined by “includes a . . . ” does not preclude the existence of other identical elements in the process, method, article, or apparatus that includes the element. In addition, it should be noted that, the scope of the method and the apparatus in the implementations of this application is not limited to performing functions in an illustrated or discussed sequence, and may further include performing functions in a basically simultaneous manner or in a reverse sequence based on the functions involved. For example, the described method may be performed in an order different from the described order, and various steps may be added, omitted, or combined. In addition, features described with reference to some examples may be combined in other examples.

Embodiments of this application are described above with reference to the accompanying drawings, but this application is not limited to the foregoing specific implementations, and the specific implementations are only illustrative and not restrictive. Under the enlightenment of this application, a person of ordinary skill in the art can make many forms without departing from the purpose of this application and the protection scope of the claims, all of which fall within the protection of this application.

The invention claimed is:

1. An electroacoustic module, comprising: an installation member, a first sounding device, and a second sounding device, wherein the installation member is provided with a first installation cavity, a second installation cavity, a first sound outlet, a second sound outlet, and a sound guide channel; the first sounding device is installed in the first installation cavity, and the first sounding device divides the first installation cavity into a first front cavity and a first rear cavity; the second sounding device is installed in the second installation cavity, and the second sounding device divides the second installation cavity into a second front cavity and a second rear cavity; the first front cavity is connected to the first sound outlet, and the first rear cavity is connected to the second front cavity through the sound guide channel; the second front cavity is connected to the second sound outlet, and the second rear cavity is a closed cavity; and a phase of a first sound wave emitted by the first sounding device through the first sound outlet is different from a phase of a second sound wave emitted by the first sounding device through the second sound outlet.

2. The electroacoustic module according to claim 1, wherein the phase of the first sound wave emitted by the first sounding device through the first sound outlet is opposite to the phase of the second sound wave emitted by the first sounding device through the second sound outlet.

3. The electroacoustic module according to claim 1, wherein the installation member comprises an installation base and an enclosing portion, the installation base is provided with the first sound outlet and the second sound outlet, the installation base and the enclosing portion enclose the first installation cavity and the second installation cavity, and along an axial direction of the first sound outlet, the first sounding device is attached to an inner wall, close to the first sound outlet, of the first installation cavity.

4. The electroacoustic module according to claim 1, wherein the sound guide channel is located between the first installation cavity and the second installation cavity along an arrangement direction of the first installation cavity and the second installation cavity, the sound guide channel is provided with a first communication hole and a second communication hole, the first communication hole is connected to the first rear cavity, and the second communication hole is connected to the second front cavity.

5. The electroacoustic module according to claim 4, wherein the first sound outlet is provided on a first side of the installation member, the second sound outlet is provided on a second side of the installation member, an axial direction of the first communication hole is parallel to an axial direction of the first sound outlet, and both the axial direction of the first sound outlet and an axial direction of the second sound outlet are perpendicular to an axial direction of the second communication hole.

6. The electroacoustic module according to claim 5, wherein the installation member comprises an installation base and a cover plate that are disposed separately, and the installation base and the cover plate are connected in a sealed manner and enclose the sound guide channel.

7. The electroacoustic module according to claim 4, wherein the first communication hole is provided with a dustproof net.

8. An electronic device, comprising a housing and an electroacoustic module;

wherein the electroacoustic module comprises: an installation member, a first sounding device, and a second sounding device, wherein the installation member is provided with a first installation cavity, a second installation cavity, a first sound outlet, a second sound outlet, and a sound guide channel; the first sounding device is installed in the first installation cavity, and the first sounding device divides the first installation cavity into a first front cavity and a first rear cavity; the second sounding device is installed in the second installation cavity, and the second sounding device divides the second installation cavity into a second front cavity and a second rear cavity; the first front cavity is connected to the first sound outlet, and the first rear cavity is connected to the second front cavity through the sound guide channel; the second front cavity is connected to the second sound outlet, and the second rear cavity is a closed cavity; and a phase of a first sound wave emitted by the first sounding device through the first sound outlet is different from a phase of a second sound wave emitted by the first sounding device through the second sound outlet;

wherein the housing is provided with an accommodating cavity, a third sound outlet, and a fourth sound outlet, the third sound outlet is provided on a first side of the accommodating cavity, the fourth sound outlet is provided on a second side of the accommodating cavity, the installation member is installed in the accommodating cavity, the first front cavity is connected to the third sound outlet through the first sound outlet, and the second front cavity is connected to the fourth sound outlet through the second sound outlet.

9. The electronic device according to claim 8, wherein the third sound outlet is provided on a display side of the housing, and the fourth sound outlet is provided on another side, adjacent to the display side, of the housing.

10. The electronic device according to claim 9, wherein the third sound outlet is located at an edge, close to a first end of the housing, of the display side, and the fourth sound outlet is provided on an end surface of the first end.

11. The electronic device according to claim 8, wherein along an axial direction of the third sound outlet, a projection of the third sound outlet is located outside a projection of the first sound outlet.

12. The electronic device according to claim 8, wherein the phase of the first sound wave emitted by the first sounding device through the first sound outlet is opposite to the phase of the second sound wave emitted by the first sounding device through the second sound outlet.

13. The electronic device according to claim 8, wherein the installation member comprises an installation base and an enclosing portion, the installation base is provided with the first sound outlet and the second sound outlet, the installation base and the enclosing portion enclose the first installation cavity and the second installation cavity, and along an axial direction of the first sound outlet, the first sounding device is attached to an inner wall, close to the first sound outlet, of the first installation cavity.

14. The electronic device according to claim 8, wherein the sound guide channel is located between the first installation cavity and the second installation cavity along an arrangement direction of the first installation cavity and the second installation cavity, the sound guide channel is provided with a first communication hole and a second communication hole, the first communication hole is connected to the first rear cavity, and the second communication hole is connected to the second front cavity.

15. The electronic device according to claim 14, wherein the first sound outlet is provided on a first side of the installation member, the second sound outlet is provided on a second side of the installation member, an axial direction of the first communication hole is parallel to an axial direction of the first sound outlet, and both the axial direction of the first sound outlet and an axial direction of the second sound outlet are perpendicular to an axial direction of the second communication hole.

16. The electronic device according to claim 15, wherein the installation member comprises an installation base and a cover plate that are disposed separately, and the installation base and the cover plate are connected in a sealed manner and enclose the sound guide channel.

17. The electronic device according to claim 14, wherein the first communication hole is provided with a dustproof net.

* * * * *